(12) United States Patent
Takanashi

(10) Patent No.: US 6,398,426 B1
(45) Date of Patent: Jun. 4, 2002

(54) CAMERA

(75) Inventor: Tatsuo Takanashi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/577,083

(22) Filed: May 24, 2000

(30) Foreign Application Priority Data

May 26, 1999 (JP) .......................................... 11-147089

(51) Int. Cl.⁷ .............................................. G03B 17/00
(52) U.S. Cl. ...................................................... 396/448
(58) Field of Search ................................. 396/448, 535, 396/439

(56) References Cited

U.S. PATENT DOCUMENTS

| 4,557,574 | A | * | 12/1985 | Kohno et al. ................ 354/288 |
| 5,508,769 | A | * | 4/1996 | Inoue et al. ................. 354/187 |
| 5,708,891 | A | * | 1/1998 | Ando et al. .................. 396/448 |
| 5,708,895 | A | * | 1/1998 | Ando et al. .................. 396/535 |
| 5,740,480 | A | * | 4/1998 | Kuhn, Jr. et al. ........... 396/177 |
| 5,765,068 | A | * | 6/1998 | Kamoda ....................... 396/448 |
| 6,151,455 | A | * | 11/2000 | Mikami et al. .............. 396/205 |

FOREIGN PATENT DOCUMENTS

| JP | 6-102570 | 4/1994 |
| JP | 11-338009 | 12/1999 |

* cited by examiner

Primary Examiner—Christopher E. Mahoney
(74) Attorney, Agent, or Firm—Ostrolenk, Faber, Gerb & Soffen, LLP

(57) ABSTRACT

The camera of the present invention is a camera having a slide barrier which is movable between a closing position where the slide barrier covers a taking lens and an opening position which is left from the taking lens, wherein a slit is formed in a portion of the slide barrier to form a click spring portion, and a click protruding portion which is engaged with a first click recessed portion and a second click recessed portion provided to a camera body is provided to the click spring portion. By suitably engaging the click protruding portion with the first click recessed portion or the second click recessed portion, the slide barrier can be positioned at the time of closing and fully opening the slide barrier.

36 Claims, 8 Drawing Sheets

CAMERA

This application claims benefit of Japanese Application No. H11-147089 filed in Japan on May 26, 1999, the contents of which are hereby incorporated by this reference.

BACKGROUND OF THE INVENTION

1. Field of the Invention

This invention relates to a camera provided with a slide barrier mechanism which covers a taking lens.

2. Related Art Statement

Recently, in the field of compact cameras, to satisfy demands on contours or design while taking into account of the protection of taking lenses and portability of cameras, cameras which cover front faces of taking lenses by means of slide barriers after sinking and accommodating taking lens barrels in camera bodies have been commercialized.

With respect to the cameras provided with these slide barrier mechanisms, cameras that are provided with mechanisms which hold the slide barriers at given positions, for example, at a closed position where the slide barriers cover the taking lenses and a fully opened position have been known.

The applicant of the present application disclosed a holding mechanism in Japanese Laid-Open Patent Publication 102570/1994 which is constituted such that in holding a slide barrier at given positions, a click ball for generating a click action and a click spring member which biases the ball are provided to a camera body and the click action is applied to the slide barrier by means of the click ball which is biased by the click spring member.

Further, a camera which includes a click mechanism formed by a slit at a portion of a camera body thus realizing a holding mechanism of a slide barrier has been proposed.

Although the camera proposed by the applicant in the above-mentioned Japanese Laid-Open Patent Publication 102570/1994 is useful in terms of holding the slide barrier by the mechanism, an operation to incorporate the above-mentioned click ball and the click spring member had to be cumbersome.

Further, in the camera provided with the click mechanism which is constituted by forming the slit in the camera body, the slit must be formed in the camera body per se. Accordingly, there has been a problem with leakage of light or intrusion of dust, small dust, water and the like requiring countermeasure taken to be resulting in the camera becomes large-sized and the cost increased.

OBJECTS AND SUMMARY OF THE INVENTION

It is the first object of the present invention to provide a camera having a simple constitution which can hold a slide barrier at given positions.

The second object of the present invention is to provide a camera having a simple constitution which can assuredly hold a slide barrier at a fully opened position or a closed position and enables a user to detect the position of the slide barrier by a click feeling.

In summary, the camera of the present invention includes a slide barrier movable between a closed position where the slide barrier covers a taking lens and an opened position left from the taking lens, wherein a click spring portion is formed in a portion of the slide barrier by providing a slit thereon and a click protruding portion provided on the click spring portion therein is engageable with both a first click recessed portion and a second click recessed portion provided in a camera body. Due to such a constitution, by suitably engaging the click protruding portion with the first click recessed portion or the second click recessed portion, the slide barrier is positioned at the time of closing the slide barrier or at the time of fully opening the slide barrier.

These objects and advantages of the present invention will become further apparent from the following detailed explanation.

DETAILED DESCRIPTION OF THE PREFERRED EMBODIMENTS

Embodiments of the present invention are explained hereinafter in conjunction with attached drawings.

Figure 1:
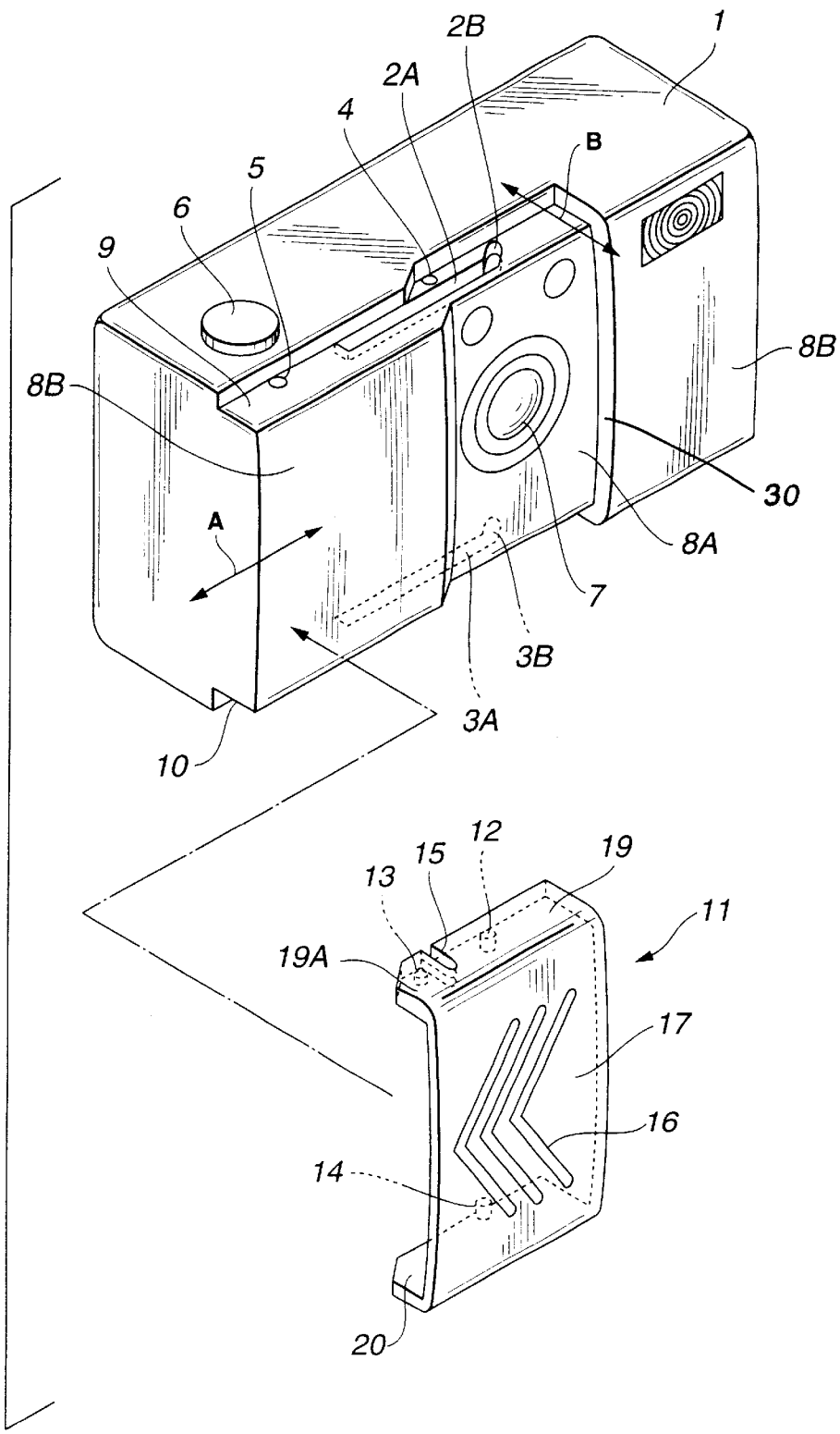
FIG. 1 is an outer appearance perspective view showing a camera of the first embodiment of the present invention in a form that a camera body and a slide barrier which covers a taking lens are exploded.
Figure 2:
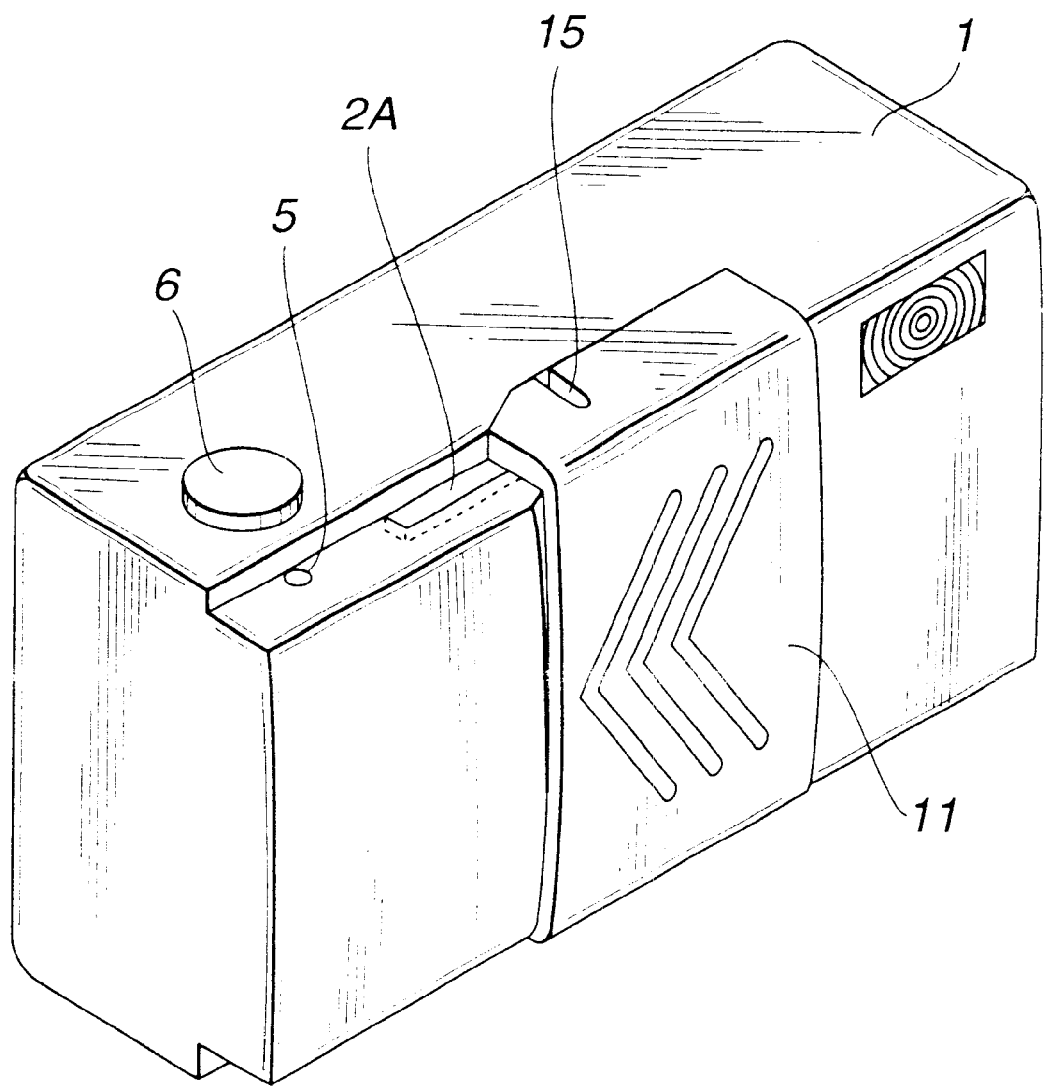
FIG. 2 is an outer appearance perspective view showing the camera of the first embodiment with the slide barrier in the closed condition after incorporating the slide barrier into the camera body.
Figure 3:
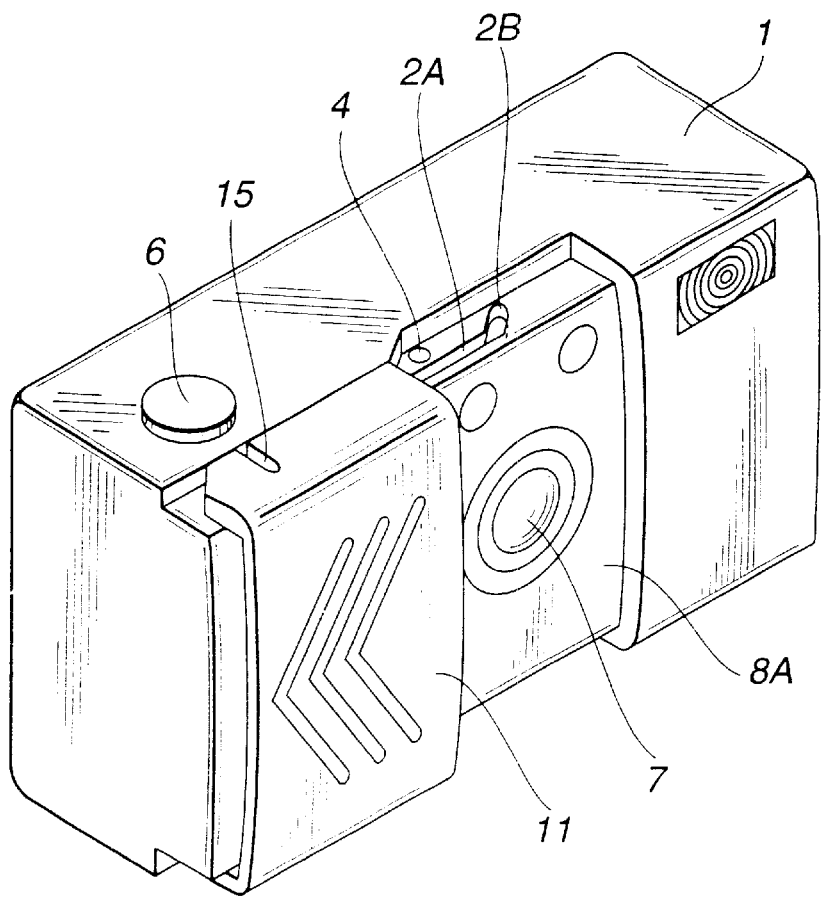
FIG. 3 is an outer appearance perspective view showing the camera of the first embodiment with the slide barrier in the opened condition after incorporating the slide barrier into the camera body.

FIG. 1 is an exploded assembly view showing a camera of the first embodiment of the present invention in a form that a camera body and a slide barrier which covers a taking lens are exploded. FIG. 2 is an outer appearance perspective view showing the above-mentioned camera with the slide barrier in the closed condition after incorporating the slide barrier into the camera body, and FIG. 3 is an outer appearance perspective view showing the above-mentioned camera with the slide barrier in the opened condition after incorporating the slide barrier into the camera body.

The camera is comprised of a camera body 1 and a slide barrier 11. The slide barrier 11 is a barrier which covers a taking lens 7 incorporated into the camera body 1 and is slidably disposed in the direction which includes both directional components indicated by A and B in the drawing on a front surface of the camera body 1. In FIG. 1, although the slide barrier 11 is shown at a position apart from the camera body 1, the slide barrier 11 is not removed from the camera body 1 once it is incorporated into the camera body 1 as will be explained later.

The constitution of the camera body 1 and the slide barrier 11 is explained hereinafter in conjunction with the attached drawings.

The camera includes a normal photograph function and a taking lens 7, which can be accommodated in the camera body 1, disposed at the approximately central portion of the front surface of the camera body 1. This taking lens 7 has a lens barrel that is protruded from the camera body 1 at the time of taking pictures and is sunk into and accommodated into the camera body 1 at the time of carrying the camera. Since this protruding and sinking mechanism is a known technique, an explanation thereof is omitted here.

In a central front surface 8A of the camera body 1 where the taking 7 is disposed, a recessed portion 30 slightly left of the optical axis direction compared to both side front surfaces 8B of the camera body 1 is formed. At the time of accommodating the taking lens 7 by sinking, the taking lens 7 is accommodated into the inside of the camera body 1 without protruding from this central front surface 8A. At the time of closing of the slide barrier 11, the slide barrier 11 is disposed in the recessed portion, wherein the front surface of the slide barrier 11 becomes approximately coplanar with the both side front surfaces 8B of the camera body 1 (see FIG. 2).

Further, stepped surfaces or level difference surfaces 9, 10 are respectively formed on front-surface-side upper and lower surfaces of the camera body 1, wherein the stepped surfaces 9, 10 extend from one side (left side in FIG. 1 when looked down) to the central portion of the camera body 1. These stepped surfaces 9, 10 have portions corresponding to the central front surface 8A that are formed more deeply rearwardly by leaving an amount of the central front surface 8A. This corresponds the closed condition of the slide barrier 11 (see FIG. 2).

In the stepped surfaces 9, 10, a pair of first cam groove 2A and third cam groove 3A are formed for allowing the movement of the slide barrier 11 in the direction which traverses the optical axis of the taking lens 7 (see an arrow A in the drawing).In addition, a pair of second cam groove 2B and the fourth cam groove 3B are formed which are contiguously connected with respective ends of the first cam groove 2A and the third cam groove 3A for allowing the movement of the slide barrier 11 in the direction which includes an optical axis direction component of the taking lens 7 (see an arrow B in the drawing).

The first cam groove 2A is formed such that it extends from one side (left side in FIG. 1) to the central portion of the camera body 1 and a length thereof corresponds to an amount of movement of the slide barrier 11 in the arrow direction A. The second cam groove 2B is formed by bending rearwardly at one end of the first cam groove 2A in the vicinity of the central portion of the camera body 1. The first cam groove 2A and the second cam groove 2B are formed as a continuous one cam groove in such a manner that a cam follower 12 which will be explained later is movable while coming into slide contact with these grooves.

As mentioned above, although the second cam groove 2B is bent rearwardly relative to the first cam groove 2A, it is not parallel to the optical axis of the taking lens 7 and includes a directional component in the direction of the arrow A. This provision is made to cope with the closing operation of the slide barrier 11.

On the lower surface of the camera body 1, the stepped surface 10 is formed in a substantially symmetrical manner with the stepped surface 9. In this stepped surface 10, the third cam groove 3A and the fourth cam groove 3B which respectively form pairs with the first cam groove 2A and the second cam groove 2B are formed. These third cam groove 3A and the fourth cam groove 3B are disposed symmetrically with the first cam groove 2A and the second cam groove 2B in both shape and position by way of the camera body 1 which is sandwiched therebetween. Further, as in the case of the first cam groove 2A and the second cam groove 2B, the third cam groove 3A and the fourth cam groove 3B are also formed as a continuous one cam groove in such a manner that the cam follower 14 which is explained later is movable while coming into slide contact with these grooves.

On the stepped surface 9 of the camera body 1, a click recessed portion 5 is formed on an extension of the other end of the first cam groove 2A. The distance between the click recessed portion 5 and the other end of the first cam groove 2A is set approximately equal to or slightly longer than the distance between the cam follower 12 provided to the slide barrier 11 and a click protruding portion 13.

Further, at a position which is shifted in the direction from the distal end of the second cam groove 2B toward the click recessed portion 5 in parallel to the first cam groove 2A, a click recessed portion 4 is formed. The distance between the click recessed portion 4 and the distal end of the second cam groove 2B is set equal to the distance between the cam follower 12 and the click protruding portion 13.

As shown in FIG. 1, a release button 6 is provided to an upper surface of the left side portion of the camera body On the other hand, the slide barrier 11 which slides while being engaged with the first cam groove 2A, the second cam groove 2B, the third cam groove 3A and the fourth cam groove 3B is incorporated into the camera body 1. The slide barrier 11 is formed of material such as resin and accordingly has a resilient property. As shown in FIG. 1, slide portions 19, 20 are extended from upper and lower portions of a barrier body 17 which covers the taking lens 7 thus providing an approximately U-shaped longitudinal cross section to the slide barrier 11. Upon incorporating the slide portions 19, 20 into the camera body 1, they are slidable relative to the stepped surfaces 9, 10.

On a surface of the slide portion 19 which faces the stepped surface 9 in an opposed manner, one cam follower 12 which is fitted into and comes into slide contact with the first cam groove 2A and the second cam groove 2B is formed in a protruding manner. On the other hand, on a surface of the slide portion 20 which faces the stepped surface 10 in an opposed manner, one cam follower 14 which is fitted into and comes into slide contact with the third cam groove 3A and the fourth cam groove 3B is formed in a protruding manner.

Further, at one side of the slide portion 19, on a surface which faces the stepped surface 9 in an opposed manner, a click protruding portion 13 which is engageable with the click recessed portion 5 and the first cam groove 2A is formed in a protruding manner. The click protruding portion 13 has a distal end formed in a semi-spherical shape.

A slit 15 is formed in the slide portion 19 in the vicinity of a position where the click protruding portion 13 is protruded and at a position close to the cam follower 12. As described previously, the slide barrier 11 has a resilient property and the slit 15 is formed and hence, a click spring portion 19A which has the resilient action property as a spring can be formed on one side portion of the slide portion 19 from the slit 15. That is, the click spring portion 19A is resiliently tiltable upwardly and downwardly corresponding to the movement of the slide barrier 11.

In incorporating the slide barrier 11 into the camera body 1 as shown in FIG. 2 and FIG. 3, the slide portions 19, 20 are slightly opened and the cam follower 12 and the cam follower 14 are respectively engaged with the first cam groove 2A and the third cam groove 3A. The engagement of these cam grooves and the cam followers are not disengaged unless an external force which exceeds a normal manipulating force is applied to the slide barrier 11.

Upon incorporating the slide barrier 11 into the camera body 1, the cam follower 12 and the cam follower 14 work as cam followers for respective cam grooves. On the other hand, the click protruding portion 13 is shorter than the cam follower 12 in height and has a distal end thereof formed in a spherical shape. Accordingly, so long as the click protruding portion 13 is engaged with the first cam groove 2A, the click protruding portion 13 is fitted into and slidably comes into contact with the cam groove 2A. However, depending on the slide position of the slide barrier 11, the click protruding portion 13 can be removed from the first cam groove 2A and rides on and slides on the stepped surface 9.

Although it will be explained later in detail, when the click protruding portion 13 reaches the position of the click recessed portion 4 or the click recessed portion 5, the click protruding portion 13 falls in and is fitted into the click recessed portion 4 or the click recessed portion 5 so as to determine the position of the slide barrier 11 (see FIG. 2 and FIG. 3). On the other hand, in case the slide barrier 11 is moved from the positioned condition by a given external force, the click protruding portion 13 is disengaged from the fitting-engagement condition and again slides on the stepped surface 9 and falls and is engaged with the first cam groove 2A when it reaches the first cam groove 2A.

As shown in FIG. 1, on a front-side surface of the slide barrier 11, a hooking portion 16 which assist the sliding of the slide barrier 11 is formed. This hooking portion 16 may be formed in a stripe pattern of either a protruding form or a recessed form.

Subsequently, the manner of operation of the slide barrier 11 of the camera of this embodiment having the above-mentioned constitution is explained in conjunction with FIG. 4 to FIG. 8.

Figure 4:
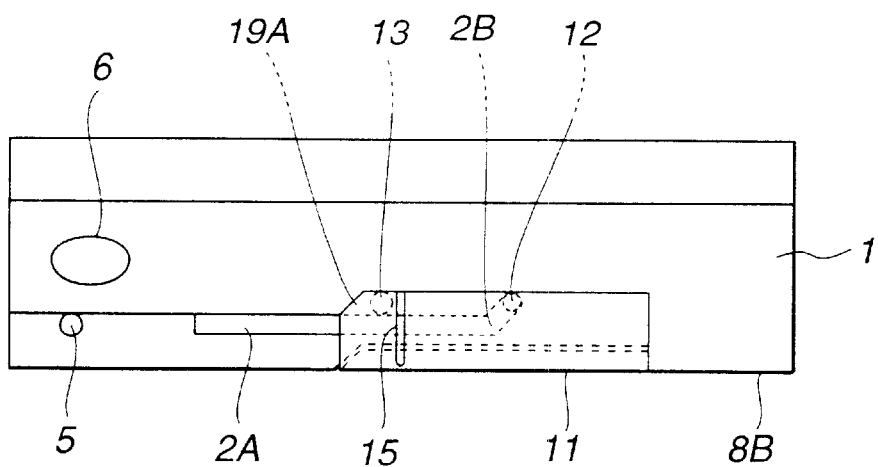
FIG. 4 is a plan view of the camera of the first embodiment showing the slide barrier in the closed condition.
Figure 5:
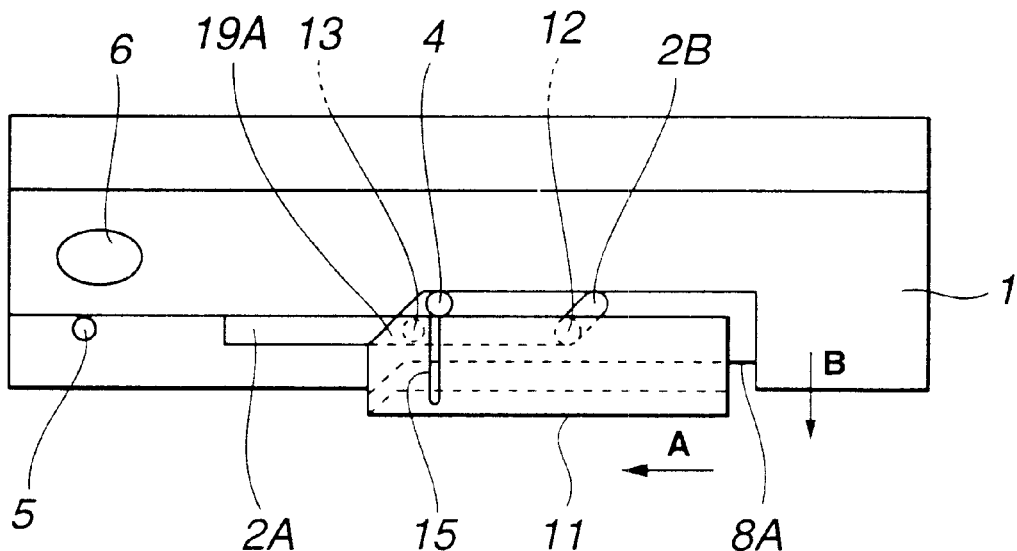
FIG. 5 is a plan view of the camera of the first embodiment showing the slide barrier in a condition where the slide barrier is slightly moved from the condition shown in FIG. 4.
Figure 6:
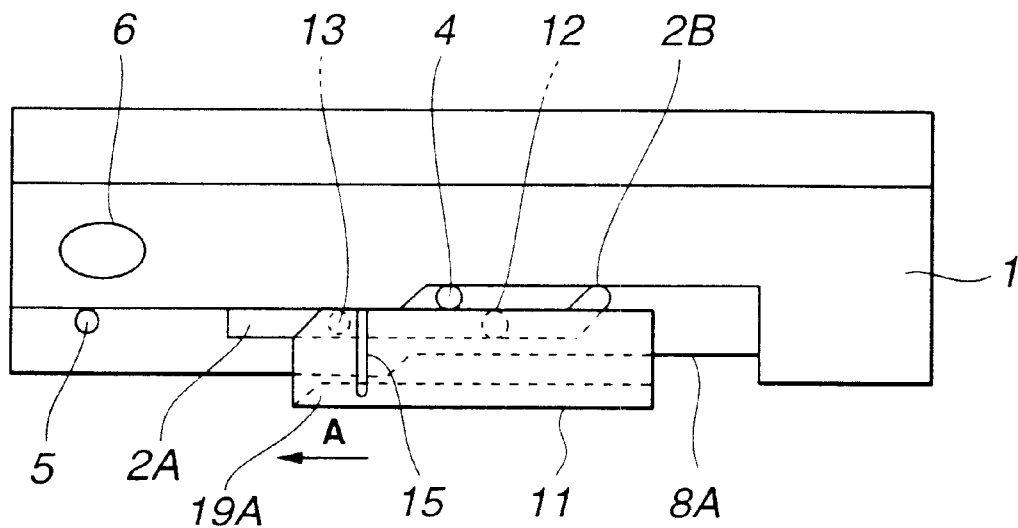
FIG. 6 is a plan view of the camera of the first embodiment showing the slide barrier in a condition where the slide barrier is further moved from the condition shown in FIG. 5.
Figure 7:
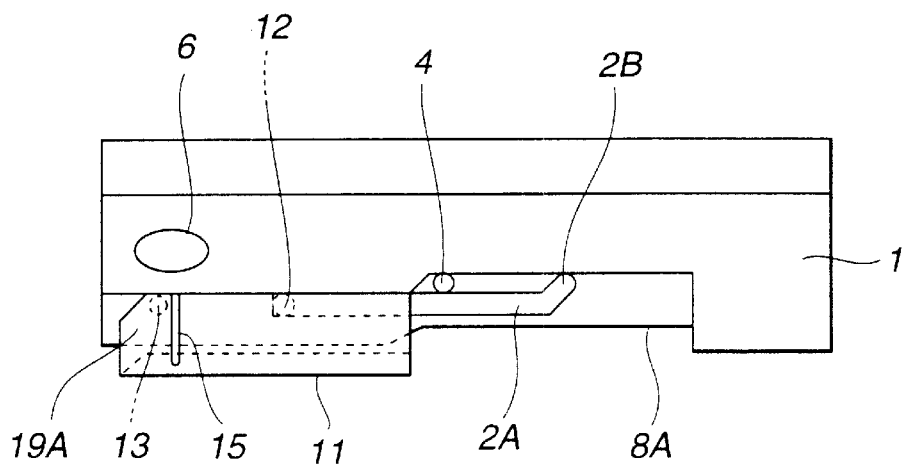
FIG. 7 is a plan view of the camera of the first embodiment showing the slide barrier in the fully opened condition.
Figure 8:
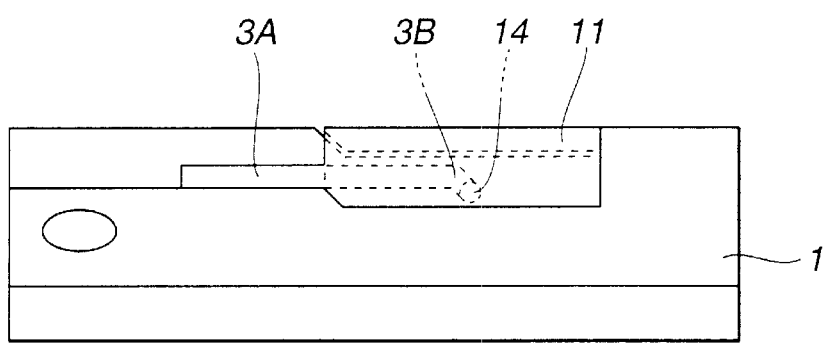
FIG. 8 is a bottom view of the camera of the first embodiment showing the slide barrier in the closed condition.

FIG. 4, FIG. 5, FIG. 6 and FIG. 7 are plan views of the camera of this embodiment, wherein FIG. 4 shows the condition where the slide barrier 11 is closed, FIG. 5 shows the condition where the slide barrier 11 is slightly moved from the condition shown in FIG. 4, FIG. 6 shows the condition where the slide barrier 11 is further moved from the condition shown in FIG. 5, and FIG. 7 shows the condition where the slide barrier 11 is fully opened. Further, FIG. 8 is a bottom view of the camera of this embodiment and shows the condition where the slide barrier 11 is closed.

When the slide barrier 11 is closed after incorporating the slide barrier 11 into the camera body 1, the slide barrier 11 is disposed at the position shown in FIG. 4 so as to cover the taking lens 7. Here, the cam follower 12 is positioned at the distal end portion of the second cam groove 2B and the click protruding portion 13 is fitted into the click recessed portion 4 while receiving a spring force or a biasing force of the click spring portion 19A. Further, the front surface of the slide barrier 11 is made substantially coplanar with the front surfaces 8B of the both side portions of the camera body 1. On the other hand, the cam follower 14 is positioned at the distal end portion of the fourth cam groove 3B (see FIG. 8).

When the manipulator applies a force to the slide barrier 11 in the leftward direction to open the slide barrier 11, as shown in FIG. 5, the cam follower 12 moves along the second cam groove 2B in the optical axis direction (see the arrow B) as well as in the direction which traverses the optical axis direction (see the arrow A). Here, the click protruding portion 13 is disengaged from the click recessed portion 4 against the biasing force of the click spring portion 19A and once rides on the stepped surface 9 and thereafter is engaged with the first cam groove 2A due to the biasing force of the click spring portion 19A.

In this manner, at the time of ride-on operation of the click protruding portion 13, the resilient property of the click spring portion 19A works effectively.

When the manipulator applies a force to the slide barrier 11 so as to move the slide barrier in the further leftward direction from the condition shown in FIG. 5, the cam follower 12 and the click protruding portion 13 move along the first cam groove 2A in the direction of arrow A (see FIG. 6).

When the slide barrier 11 is further moved in the leftward direction, the click protruding portion 13 reaches the end of the first cam groove 2A. When the slide barrier 11 is further moved on, the click protruding portion 13 is disengaged from the first cam groove 2A against the biasing force of the click spring portion 19A and rides on the stepped surface 9 and slides on the stepped surface 9. Thereafter, when the click protruding portion 13 reaches the click recessed portion 5, it is fitted into the click recessed portion 5 due to the biasing force of the click spring portion 19A. Due to this fitting engagement, a click feeling is given so that the manipulator can detect that the slide barrier 11 is fully opened. This condition, that is, the condition that the slide barrier 11 is fully opened is shown in FIG. 7. As mentioned previously, the click feeling is given also at the time that the slide barrier 11 is moved to the condition where the slide barrier 11 is closed (condition shown in FIG. 4) in the same manner.

On the other hand, although not shown in the drawing, the cam follower 14 also moves along the third cam groove 3A and the fourth cam groove 3B in the same manner as the cam follower 12.

Figure 9:
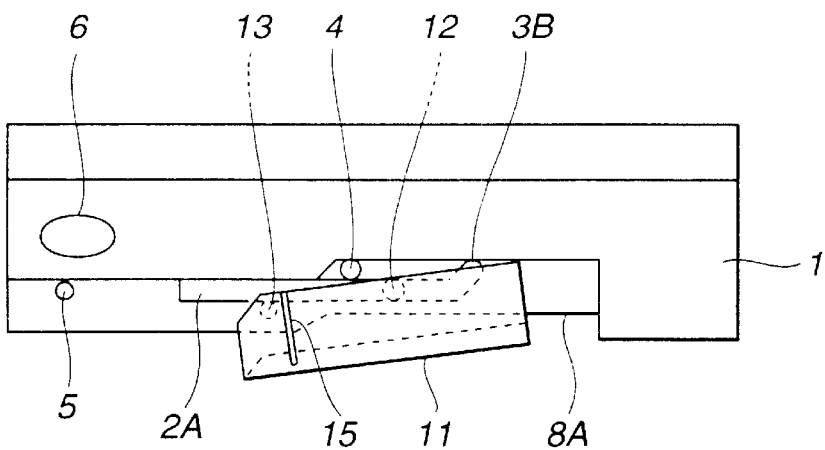
FIG. 9 is a plan view of the camera of the first embodiment showing the slide barrier in one condition.

As mentioned above, the click protruding portion 13 can be disengaged from any one of the click recessed portion 4, the click recessed portion 5 and the first cam groove 2A and can ride on the stepped surface 9. Accordingly, depending on the manipulation of the manipulator, the slide barrier 11 may take the condition shown in FIG. 9. However, since the slide barrier 11 is assuredly supported by the cam follower 12 and the cam follower 14, the inconvenience of removing the slide barrier 11 from the camera body 1 can be eliminated.

As has been described heretofore, according to camera of the first embodiment, with the use of the simple constitution which employs a portion of the slide barrier 11 as a resilient portion, the slide barrier 11 can be assuredly held at the fully opened position or at the closed position and the manipulator can detect the slide barrier position by the click feeling.

The camera of the second embodiment of the present invention is explained hereinafter.

Although the camera of the first embodiment is provided with a set of the click recessed portion 4, the click recessed portion 5 and the click protruding portion 13 for determining the position of the slide barrier 11 on the upper surface portion of the camera, the second embodiment is characterized by having another one set of such positioning mechanism on the bottom portion of the camera.

Figure 10:
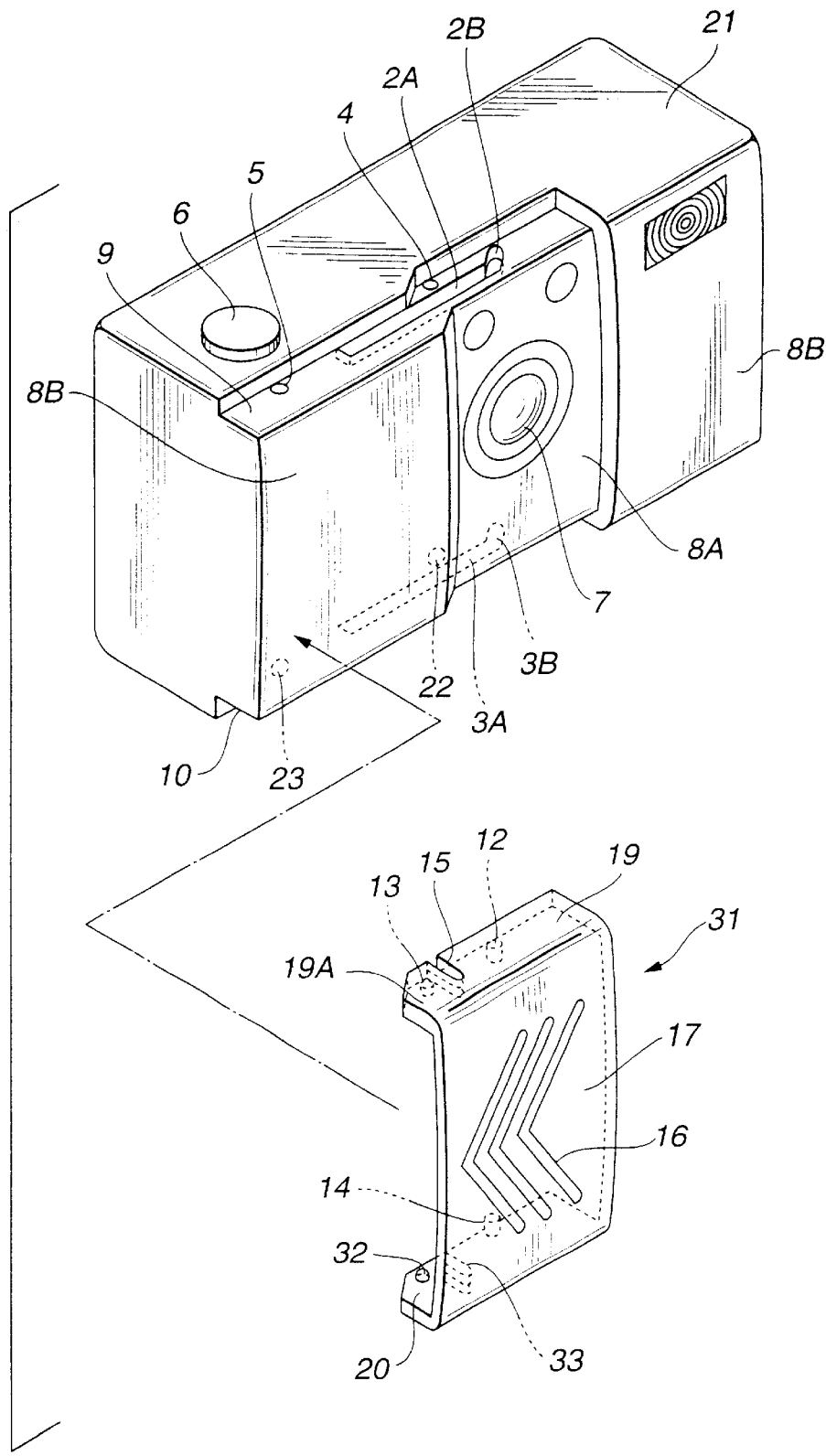
FIG. 10 is an exploded assembly view showing a camera of the second embodiment of the present invention in a form that a camera body and a slide barrier which covers a taking lens are exploded.
Figure 11:
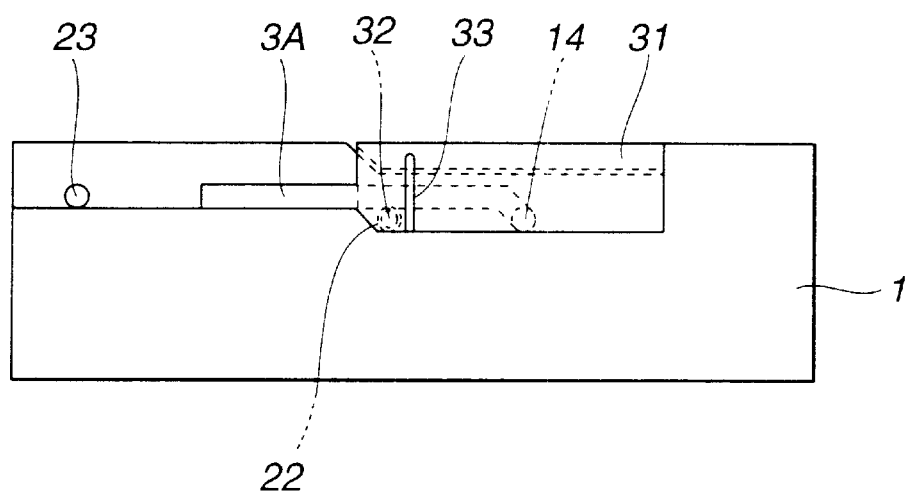
FIG. 11 is a bottom view of the camera of the second embodiment with the slide barrier in the closed condition.

FIG. 10 is an exploded assembly view showing the camera of the second embodiment of the present invention in the condition that the camera body and the slide barrier which covers the taking lens are exploded, and FIG. 11 is a bottom view of the camera and shows the condition where the slide barrier is closed. Constitutional elements similar to those of the first embodiment are given same numerals and their explanation is omitted here.

As shown in FIG. 10, as in the case of the first embodiment, a click recessed portion 4 and a click recessed portion 5 are provided to a stepped surface 9 formed on an upper surface of the a camera body 21. Further, to a stepped surface 10 formed on a bottom surface of the camera body 21, a click recessed portion 22 and a click recessed portion 23 which have the same size and same shape as those of the click recessed portion 4 and the click recessed portion 5 are formed at positions symmetrical with the click recessed portion 4 and the click recessed portion 5.

On the other hand, a slide barrier 31 which is incorporated into the camera body 21 is formed of material such as resin and accordingly has the resilient property. Further, on the bottom-surface-side slide portion 20, at positions symmetrical with the click protruding portion 13, the click protruding portion 32 which has the same shape and size as those of the click protruding portion 13 is formed. Further, in the vicinity of the click protruding portion 32, a slit 33 which is similar to the slit 15 is formed.

The click recessed portion 22, the click recessed portion 23, the click protruding portion 32 and the slit 33 perform the same roles or functions as the above-mentioned click recessed portion 4, the click recessed portion 5, the click protruding portion 13 and the slit 15.

In the camera of the second embodiment having the above-mentioned constitution, in incorporating the slide barrier 31 into the camera body 21, as in the case of the first embodiment, the slide portions 19, 20 are slightly opened and the cam follower 12 and the cam follower 14 are respectively engaged with the first cam groove 2A and the third cam groove 3A. After the slide barrier 31 is incorporated into the main body, so long as both of the click protruding portions 13, 32 are engaged with the cam grooves, these protruding portions 13, 32 move while being fitted into and coming into slide contact with the cam grooves. Further, depending on the slide position of the slide barrier 31, these protruding portions 13, 32 are disengaged from the cam grooves and ride on the stepped surfaces 9, 10 and slide on the stepped surfaces 9, 10. Further, when the click protruding portions 13, 32 reach the above-mentioned click recessed portions 4, 5 or 22, 23, they fall in and are engaged with the click recessed portions 4, 5 or 22, 23 so as to position the slide barrier 31.

Since the other constitution and the manner of operation are similar to those of the first embodiment, the detailed explanation thereof is omitted here.

Although the click protruding portion 32 and the like are added in the second embodiment compared to the first embodiment, time and labor necessary for carrying out steps for incorporating the slide barrier into the camera body is substantially the same and the holding performance to hold the slide barrier 31 is superior to that of the first embodiment. Further, it is needless to say that the second embodiment provides the same effects as those of the first embodiment.

Although the click spring portion 19A is provided by forming the slit 15 at the portion of the slide barrier 11 in the above embodiments, the click spring portion 19A is not limited to this form and may be provided by disposing a spring member (equipped with a member equivalent to the click protruding portion 13) which constitutes a separate body with respect to the slide barrier 11 at the same position. In case of providing the separate spring member, besides the effects obtained by the above-mentioned embodiments, a desired spring property can be obtained without being restricted by the material of the slide barrier 11.

Figure 12:
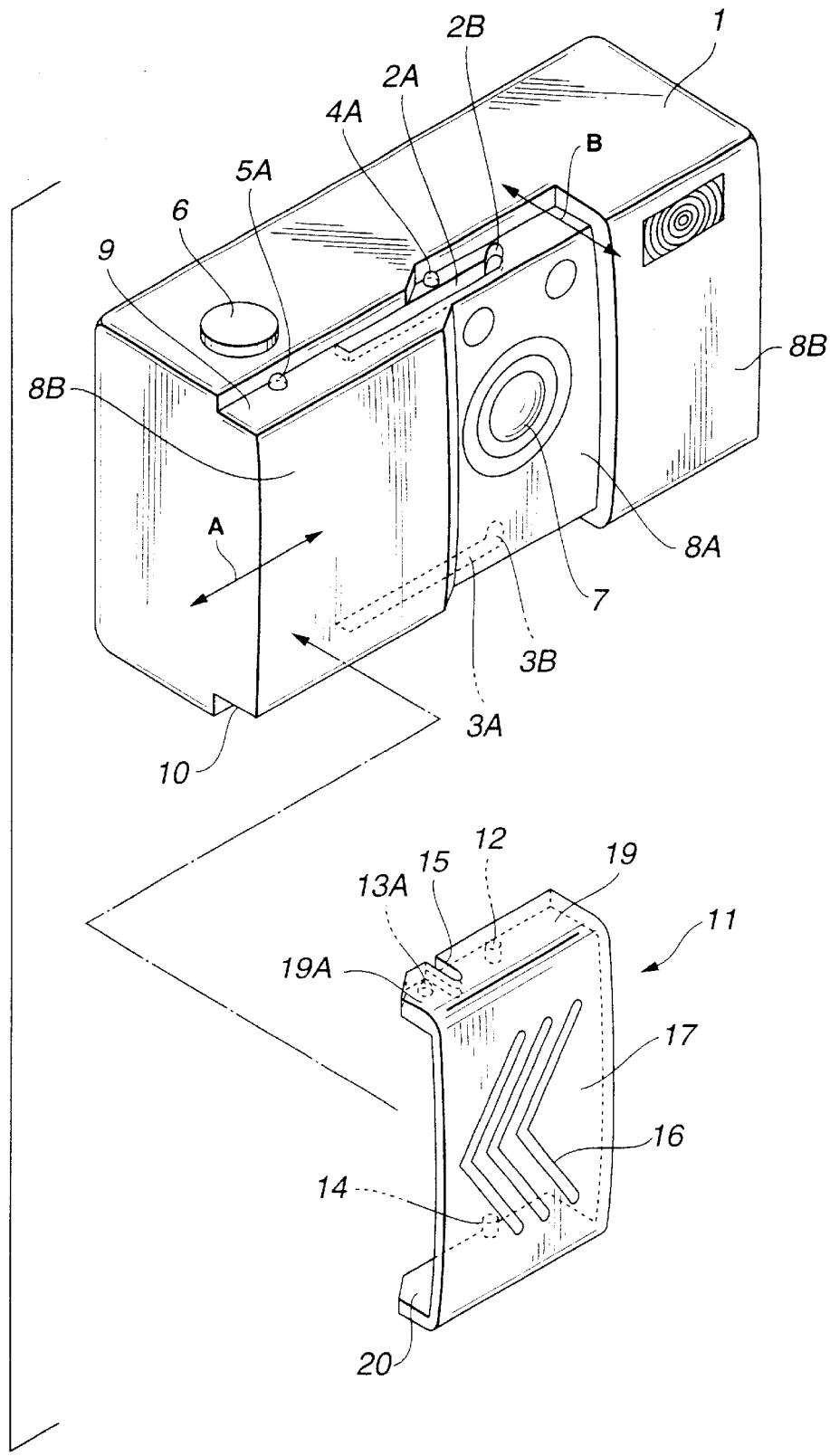
FIG. 12 is an outer appearance perspective view showing a camera of the third embodiment of the present invention with a camera body and a slide barrier which covers a taking lens in an exploded form.

Further, as the third embodiment of the present invention, as shown in FIG. 12, a mode where the click protruding portions formed on the slide barrier of the above-mentioned first or second embodiment are replaced with click recessed portions 13A and the click recessed portions formed on the camera body are replaced with click protruding portions 4A, 5A (which are engaged with the above-mentioned replacing click processed portions) is considered.

With this third embodiment, the effects similar to those of the first and second embodiments can be obtained. Although the click protruding portions which are similar to the click protruding portions of the slide barrier of the first and second embodiment do not travel along the inside of the cam grooves, there are no special disadvantages in opening and closing of the slide barrier.

In this invention, it is apparent that working modes different in a wide range can be formed on the basis of this invention without departing from the spirit and scope of the invention. This invention is not restricted by any specific embodiment except being limited by the appended claims.

What is claimed is:

1. A camera comprising;

a camera body including a taking lens and having a cam groove on an outer portion thereof, and a barrier having a cam follower capable of being engaged with and coming into slide contact with the cam groove; the barrier being movable between a position where the barrier covers at least a portion of the taking lens and a position away from the taking lens in such a manner that the barrier traverses an optical axis of the taking lens, the barrier including a spring portion integrally formed with the barrier which is capable of applying a biasing force to the camera body; wherein the barrier is integrally and entirely formed of resin.

2. A camera according to claim 1, wherein the camera body and the barrier form a click device which positions the barrier to a given position of the camera body due to a biasing force of the spring action.

3. A camera comprising:

a camera body including a taking lens; and a barrier being movable between a position where the barrier covers at least a portion of the taking lens and a position away from the taking lens, the barrier integrally having a spring portion which is capable of applying a biasing force to the camera body; wherein the barrier is integrally and entirely formed of resin.

4. A camera according to claim 3, further comprising a click device to position the barrier to a give position of the camera body due to a biasing force of the spring portion.

5. Camera according to claim 3, wherein the barrier includes a slit so as to form the spring portion and the spring portion is displaceable.

6. A camera according to claim 3, wherein the barrier includes a plurality of spring portions.

7. A camera comprising:
a camera body including a taking lens and a first engaging portion for clicking; and
a barrier being movable between a position where the barrier covers at least a portion of the taking lens and a position away from the taking lens, the barrier including a second engaging portion engageable with the first engaging portion, the barrier integrally including a spring portion, wherein the first and second engaging portions are engageable with each other due to a biasing force of the spring portion; wherein the barrier is integrally and entirely formed of resin.

8. A camera according to claim 7, wherein the barrier includes a slit so as to form the spring portion.

9. A camera according to claim 7, wherein the barrier includes a plurality of spring portions.

10. A camera according to claim 7, wherein the first engaging portion is a recessed portion and the second engaging portion is a protruding portion.

11. A camera comprising: a barrier which is movable between a position where the barrier covers at least a portion of a taking lens and a position which is away from the taking lens, the barrier including a slit to integrally form a spring portion with the barrier, the spring portion including a pressing member from a group consisting of a protruding portion and a recessed portion; and
a camera body having a portion correspondingly engageable with the pressing member of the spring portion.

12. A camera comprising: a barrier which is movable between a position where the barrier covers at least a portion of a taking lens and a position which is away from the taking lens, a spring portion being integrally formed with the barrier, the spring portion having a protruding portion; and
a camera body including a recessed portion which is engageable with the protruding portion due to a biasing force of the spring portion; wherein the barrier is integrally and entirely formed of resin.

13. A camera according to claim 12, wherein the barrier includes a plurality of spring portions.

14. A camera according to claim 12, wherein the barrier includes a slit so as to form the spring portion.

15. A camera according to claim 12, wherein the protruding portion and the recessed portion are engaged with each other so as to hold the barrier at given positions.

16. A camera according to claim 12, wherein the protruding portion and the recessed portion are engaged with each other at a plurality of positions for holding the barrier at a plurality of given positions.

17. A camera comprising: a barrier which is movable between a position where the barrier covers a taking lens and a position which is away from the taking lens, a spring portion integrally formed with the barrier, the spring portion including a recessed portion; and
a camera body including a protruding portion which is engageable with the recessed portion due to a biasing force of the spring portion; wherein the barrier is integrally and entirely formed of resin.

18. A camera according to claim 17, wherein the protruding portion and the recessed portion are engaged with each other so as to hold the barrier at a given position.

19. A camera according to claim 17, wherein the protruding portion and the recessed portion are engaged with each other at a plurality of positions for holding the barrier at a plurality of given positions.

20. A camera comprising: a barrier which is movable between a position where the barrier covers at least a portion of a taking lens and a position which is away from the taking lens, a spring portion integrally formed with the barrier, the spring portion including a pressing member from a group consisting of a protruding portion and a recessed portion; and
a camera body having a portion correspondingly engageable with the pressing member of the spring portion; wherein the barrier is integrally and entirely formed of resin.

21. A camera comprising;
a camera body having a cam groove on an outer portion thereof, the camera body including a taking lens; and
a barrier having a cam follower capable of being engaged with and coming into slide contact with the cam groove; the barrier being movable between a position where the barrier covers at least a portion of the taking lens and a position away from the taking lens in such a manner that the barrier traverses an optical axis of the taking lens, the barrier including a slit to integrally form a spring portion with the barrier which is capable of applying a biasing force to the camera body.

22. A camera according to claim 21, wherein the camera body and the barrier form a click device which positions the barrier to a given position of the camera body due to a biasing force of the spring action.

23. A camera comprising:
a camera body including a taking lens; and
a barrier being movable between a position where the barrier covers at least a portion of the taking lens and a position away from the taking lens, the barrier having a slit to integrally form a spring portion with the barrier which is capable of applying a biasing force to the camera body.

24. A camera according to claim 23, further comprising a click device to position the barrier to a give position of the camera body due to a biasing force of the spring portion.

25. A camera according to claim 23, wherein the barrier includes a plurality of spring portions.

26. A camera comprising:
a camera body including a taking lens and a first engaging portion for clicking; and
a barrier being movable between a position where the barrier covers at least a portion of the taking lens and a position away from the taking lens, the barrier including a second engaging portion engageable with the first engaging portion, the barrier including a slit to integrally form a spring portion with the barrier, wherein the first and second engaging portions are engageable with each other due to a biasing force of the spring portion.

27. A camera according to claim 26, wherein the barrier includes a plurality of spring portions.

28. A camera according to claim 26, wherein the first engaging portion is a recessed portion and the second engaging portion is a protruding portion.

29. A camera according to claim 26, wherein the barrier is made of a synthetic resin.

30. A camera comprising: a barrier which is movable between a position where the barrier covers at least a portion of a taking lens and a position which is away from the taking lens, the barrier including a slit to integrally form a spring portion being integrally formed with the barrier, the spring portion having a protruding portion; and a camera body including a recessed portion which is engageable with the protruding portion due to a biasing force of the spring portion.

31. A camera according to claim 30, wherein the barrier includes a plurality of spring portions.

32. A camera according to claim 30, wherein the protruding portion and the recessed portion are engaged with each other so as to hold the barrier at given positions.

33. A camera according to claim 30, wherein the protruding portion and the recessed portion are engaged with each other at a plurality of positions for holding the barrier at a plurality of given positions.

34. A camera comprising: a barrier which is movable between a position where the barrier covers a taking lens and a position which is away from the taking lens, the barrier including a slit to integrally form a spring portion with the barrier, the spring portion including a recessed portion; and a camera body including a protruding portion which is engageable with the recessed portion due to a biasing force of the spring portion.

35. A camera according to claim 34, wherein the protruding portion and the recessed portion are engaged with each other so as to hold the barrier at a given position.

36. A camera according to claim 34, wherein the protruding portion and the recessed portion are engaged with each other at a plurality of positions for holding the barrier at a plurality of given positions.

* * * * *